US011511571B2

(12) United States Patent
Pizzorno et al.

(10) Patent No.: US 11,511,571 B2
(45) Date of Patent: Nov. 29, 2022

(54) TYRE FOR HEAVY LOAD VEHICLE WHEELS

(71) Applicant: Pirelli Tyre S.p.A., Milan (IT)

(72) Inventors: Tommaso Pizzorno, Milan (IT); Claudio Minoli, Milan (IT); Daniele Lorenzetti, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 517 days.

(21) Appl. No.: 16/317,125

(22) PCT Filed: Jul. 4, 2017

(86) PCT No.: PCT/IB2017/054025
§ 371 (c)(1),
(2) Date: Jan. 11, 2019

(87) PCT Pub. No.: WO2018/015832
PCT Pub. Date: Jan. 25, 2018

(65) Prior Publication Data
US 2019/0225030 A1 Jul. 25, 2019

(30) Foreign Application Priority Data

Jul. 18, 2016 (IT) .................. 102016000074580

(51) Int. Cl.
*B60C 11/13* (2006.01)
*B60C 11/03* (2006.01)
(52) U.S. Cl.
CPC ...... *B60C 11/1353* (2013.01); *B60C 11/0306* (2013.01); *B60C 11/1369* (2013.01);
(Continued)
(58) Field of Classification Search
CPC .............................................. B60C 2011/0365
See application file for complete search history.

(56) References Cited

U.S. PATENT DOCUMENTS

| 4,945,966 A | 8/1990 | Ogawa |
| 5,024,260 A | 6/1991 | Ochiai |

(Continued)

FOREIGN PATENT DOCUMENTS

| EP | 2 371 584 A2 | 10/2011 |
| EP | 2 371 584 A3 | 3/2012 |

(Continued)

OTHER PUBLICATIONS

US-2014360640 Fujioka Full Document (Year: 2014).*
(Continued)

*Primary Examiner* — Jacob T Minskey
*Assistant Examiner* — Adrien J Bernard
(74) *Attorney, Agent, or Firm* — Finnegan, Henderson, Farabow, Garrett & Dunner, L.L.P.

(57) ABSTRACT

Tyre (1) for heavy load vehicle wheels, having a tread band (8) comprising: —a plurality of circumferential grooves (3, 4, 5, 6); —a plurality of transverse grooves (15) extending between two axially consecutive circumferential grooves (3, 4, 5, 6), thus defining a plurality of blocks (21); —each block (21) comprising a radially outer top surface (7) and having a height (M) measured between said top surface and a bottom surface of a respective transverse groove (15); —said transverse grooves (15) comprising a first segment (16) having a width L1 and a second segment (17) having a width L2, where L2<L1; —said first segment (16) being at least partially delimited by walls of two circumferentially consecutive blocks (20, 21); —at least one filling element (18) contained within said first segment (16); —said at least one filling element (18) having a radially outer top surface (19), located radially inwardly relative to said top surface (7) of the block at a radial distance (D) between 5% and 50% of the height (M) of the blocks (21); —the plan surface area (A2) of said top surface (19) of said at least one
(Continued)

filling element (18) being greater than 60% of the plan surface area (Ai) of said first segment (16); —said at least one filling element (18) being spaced apart from said walls (27, 28) along at least 70% of its perimeter (P).

22 Claims, 6 Drawing Sheets

(52) U.S. Cl.
CPC ............... *B60C 2011/0346* (2013.01); *B60C 2011/0348* (2013.01); *B60C 2011/0365* (2013.01); *B60C 2011/0367* (2013.01); *B60C 2011/1361* (2013.01); *B60C 2200/06* (2013.01)

(56) References Cited

U.S. PATENT DOCUMENTS 6,467,517 B1    10/2002    Radulescu

2014/0360640 A1*    12/2014    Fujioka ............... B60C 11/0327
2015/0360519 A1*    12/2015    Kuwano ............... B60C 11/047
                                                                                                           152/209.19
2016/0297255 A1*    10/2016    Wakizono ........... B60C 11/0327

FOREIGN PATENT DOCUMENTS

| EP | 2 436 535 A2 | 4/2012 |
|---|---|---|
| EP | 2 436 535 A3 | 8/2012 |
| EP | 3 042 789 A1 | 7/2016 |
| JP | H 3-153404 | 7/1991 |

OTHER PUBLICATIONS

US-2015360519 Kuwano Full Document (Year: 2015).*
International Search Report form the European Patent Office in corresponding International Application No. PCT/IB2017/054025 dated Oct. 26, 2017.
Written Opinion of the International Searching Authority from the European Patent Office in corresponding International Application No. PCT/IB2017/054025 dated Oct. 26, 2017.

* cited by examiner

TYRE FOR HEAVY LOAD VEHICLE WHEELS

This application is a Section 371 national phase application based on International Application No. PCT/162017/054025, filed Jul. 4, 2017, and claims priority to Italian Patent Application No. 102016000074580, filed Jul. 18, 2016; the content of each application is incorporated herein by reference.

FIELD OF THE INVENTION

The present invention relates to a tyre for heavy load vehicle wheels, particularly wheels adapted to be fitted to the drive axle of heavy load vehicles.

By the expression "heavy load vehicle" it is meant a vehicle belonging to classes M2~M3, N2~N3 and O2~O4 defined in "Consolidated Resolution of the Construction of Vehicles (R.E.3)", such as for example trucks, lorries, tractors, busses, vans and other similar vehicles.

Tyres for wheels adapted to be fitted to the drive axle of heavy load vehicles (in the following shortly referred to as "traction tyres") are, in particular, tyres for heavy load vehicle wheels intended to transfer the torque to the ground and are thus designed for as much as possible "grabbing" at the ground in any condition: dry road surfaces, wet and/or snow-covered road surfaces.

This feature also depends on the tread band pattern of the tyre, in particular it may depend on the presence of a large number of transverse grooves. These grooves typically cross circumferential grooves and define tread band portions called blocks.

Tyres intended for use with heavy load vehicles, particularly traction tyres, are also typically required to have excellent features as to draining, low rolling resistance, wear evenness and handling (or lateral stability).

U.S. Pat. Nos. 4,945,966, 6,467,517 and U.S. Pat. No. 5,024,260 describe tyres for heavy load vehicle wheels.

SUMMARY OF THE INVENTION

The Applicant has observed that a large number of transverse grooves on the one hand increases the traction ability of the tyre, on the other hand may critically increase the circumferential mobility of the blocks.

An undue mobility of the blocks, which typically occurs while entering and while leaving the footprint area, may cause the appearance of uneven wear and/or high rolling resistance.

The Applicant has thus felt the need to provide a tyre for heavy load vehicle wheels, particularly a traction tyre, which has good traction features on any kind of road surface, and nevertheless has low rolling resistance, long service life, and limits the arising of uneven wear phenomena.

The Applicant has found that such needs can be met by providing, in the tread pattern of the tyre, transverse grooves having a segment of reduced width and a segment of larger width, and a filling element extending within the segment of larger width for counteracting the circumferential mobility of adjacent blocks, more particularly their mutual approach.

In a first aspect thereof, the invention relates to a tyre for heavy load vehicle wheels, having a tread band comprising:

a plurality of circumferential grooves;
a plurality of transverse grooves extending between two axially consecutive circumferential grooves, thus defining a plurality of blocks;
each block comprising a radially outer top surface and having a height measured between the top surface and a bottom surface of one of the transverse groove.

The transverse grooves comprise a first segment having a width L1 and a second segment having a width L2, where $L2<L1$.

The first segment is at least partially delimited by walls of two circumferentially consecutive blocks.

At least one filling element is contained within the first segment, the filling element having a radially outer top surface, located radially inwardly relative to the top surface of the block at a radial distance between 5% and 50% of the height of the blocks.

Preferably, the plan surface area of the top surface of said at least one filling element is greater than 60% of the plan surface area of the first segment.

Preferably, the at least one filling element is spaced apart from the walls of two circumferentially consecutive blocks along at least 70% of its perimeter.

The Applicant has made a tyre having a tread band provided with transverse grooves extending continuously from a circumferential groove to the axially consecutive one. The transverse grooves have a segment of reduced width, for providing a circumferential continuity of the rubber contacting the ground while rolling, and a segment of larger width, for increasing the traction ability of the tyre. The segment of larger width is provided with at least one mobile filling element having a height lower than the height of the adjacent blocks, for limiting the mobility of the blocks, while entering and while leaving the footprint area, without compromising at the same time the traction ability of the blocks themselves.

In general terms, the Applicant believes that the presence of transverse grooves formed by a segment of larger width and a segment of smaller width allows a good compromise between traction ability and reduced rolling resistance to be reached.

Furthermore, the Applicant believes that the presence of the filling element located within the segment of larger width of the transverse groove counteracts an undue mutual approach of the adjacent blocks when entering the footprint area. On the other hand, when leaving the footprint area, the same filling element carries out an elastic returning action, preventing the blocks from moving circumferentially too much away from each other.

Furthermore, the filling element undergoes a larger wear due to its size and to a greater mobility as compared to the size and mobility of the adjacent blocks; therefore, a certain height difference between the blocks and the filling element is maintained substantially during the entire service life of the tyre, and the traction ability of the latter is thus not compromised.

The following definitions apply in the present description and the subsequent claims. By "equatorial plane" of the tyre it is meant a plane perpendicular to the rotation axis of the tyre and dividing the tyre into two equal portions.

The terms "radial" and "axial" and the expressions "radially inner/outer" and "axially inner/outer" are used with reference, respectively, to a direction perpendicular to and a direction parallel to the rotation axis of the tyre, whereas the terms "circumferential" and "circumferentially" are used with reference to the direction of annular development of the tyre, i.e. the tyre rolling direction.

Thus:
- by "radial direction" it is meant a direction developing generally away from the rotation axis of the tyre;
- by "axial direction" it is meant a direction parallel to the rotation axis of the tyre, or inclined relative to such axis by an angle smaller than 45°;
- by "circumferential direction" it is meant a direction parallel to the rolling direction of the tyre, or inclined relative to the rolling direction of the tyre by an angle smaller than 45°.

The present invention, in one or more preferred aspects thereof, may comprise one or more of the features hereinafter presented.

Preferably, the at least one filling element may be spaced apart from the walls along at least 95% of its perimeter, more preferably along its whole perimeter.

Advantageously, the walls may comprise two circumferentially opposite lateral walls of two circumferentially consecutive blocks. The at least one filling element may have at least one lateral surface, the lateral surface may extend radially from the top surface of the at least one filling element.

Preferably, the lateral surface of the at least one filling element may be spaced apart from each lateral wall of the blocks by a distance greater than 0.5 mm. Conveniently, the lateral surface of the at least one filling element may be spaced apart from each lateral wall of the blocks over its whole radial extension.

Advantageously, the lateral surface of the at least one filling element may be spaced apart from each lateral wall of the blocks by a distance smaller than 5 mm.

Preferably, the walls of the blocks further comprise at least one head wall opposing a circumferential groove; the lateral surface of the at least one filling element may be spaced apart from the head wall by a distance greater than 0.5 mm.

Advantageously, the lateral surface of the at least one filling element may be spaced apart from the head wall of the blocks by a distance smaller than 10 mm, preferably smaller than 5 mm.

Conveniently, the lateral surface of the at least one filling element may be spaced apart from the head wall of the blocks over its whole radial extension.

Preferably, the at least one filling element is present only in the first segment of the transverse grooves.

Advantageously, at least a portion of the lateral surface of the at least one filling element may face a circumferential groove.

Preferably, the first segment of the transverse grooves extends over between 30% and 70% of the distance between said two axially consecutive circumferential grooves.

Conveniently, the second segment may extend over between 30% and 70% of the distance between two axially consecutive circumferential grooves.

Advantageously, the sum of the axial extension of the first segment and of the second segment of the transverse grooves is equal to the distance between the two axially consecutive circumferential grooves.

Preferably, the width L2 is equal to or smaller than 2 mm.
Preferably, the width L1 is equal to or greater than 4 mm.
Advantageously, the transverse grooves may have a substantially constant depth along their extension.

Conveniently, in the transverse grooves the first segment may be located consecutively to the second segment.

Preferably, the number of transverse grooves formed in the tread band may be greater than forty, even more preferably greater than fifty.

Advantageously, the blocks have a maximum dimension in circumferential direction smaller than 70 mm, preferably smaller than 60 mm.

Conveniently, considering a reference circumferential direction which intersects the transverse grooves, the first segments of circumferentially consecutive transverse grooves alternate on both sides relative to the reference circumferential direction.

Preferably, the tread band may have a central annular portion located across the equatorial plane and two shoulder annular portions separated from the central annular portion by two circumferential grooves; the central annular portion may have at least one row of central blocks and at least two rows of lateral blocks oppositely located relative to said at least one row of central blocks; the rows of lateral blocks may have a plurality of transverse grooves provided with the filling element. Preferably, the at least one row of central blocks has transverse grooves not provided with a filling element. The transverse grooves of the at least one row of central blocks may have a width equal to or smaller than 4 mm. Preferably, the two shoulder annular portions have transverse grooves not provided with a filling element. The transverse grooves of the two shoulder annular portions may have a width equal to or greater than 2 mm.

BRIEF DESCRIPTION OF THE DRAWINGS

Further features and advantages of the invention shall become clearer from the detailed description of some preferred, although not exclusive, embodiments of a tyre for heavy load vehicle wheels according to the present invention.

Such description shall be made hereafter with reference to the accompanying drawings, provided only for indicating, and thus non-limiting, purposes, wherein.

DETAILED DESCRIPTION OF EMBODIMENTS

Figure 1:
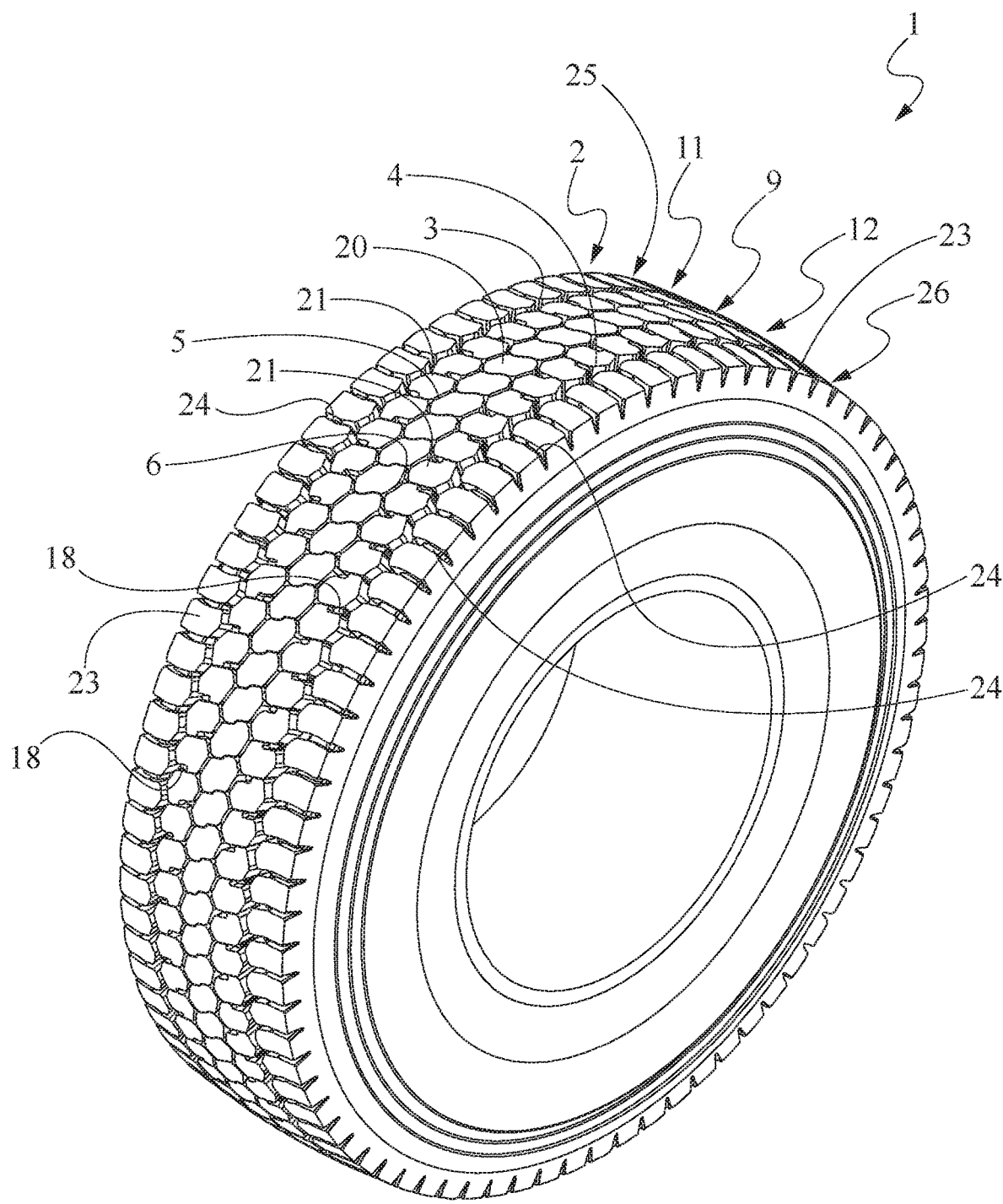
FIG. 1 is a perspective view of an example of tyre according to the invention.
Figure 2:
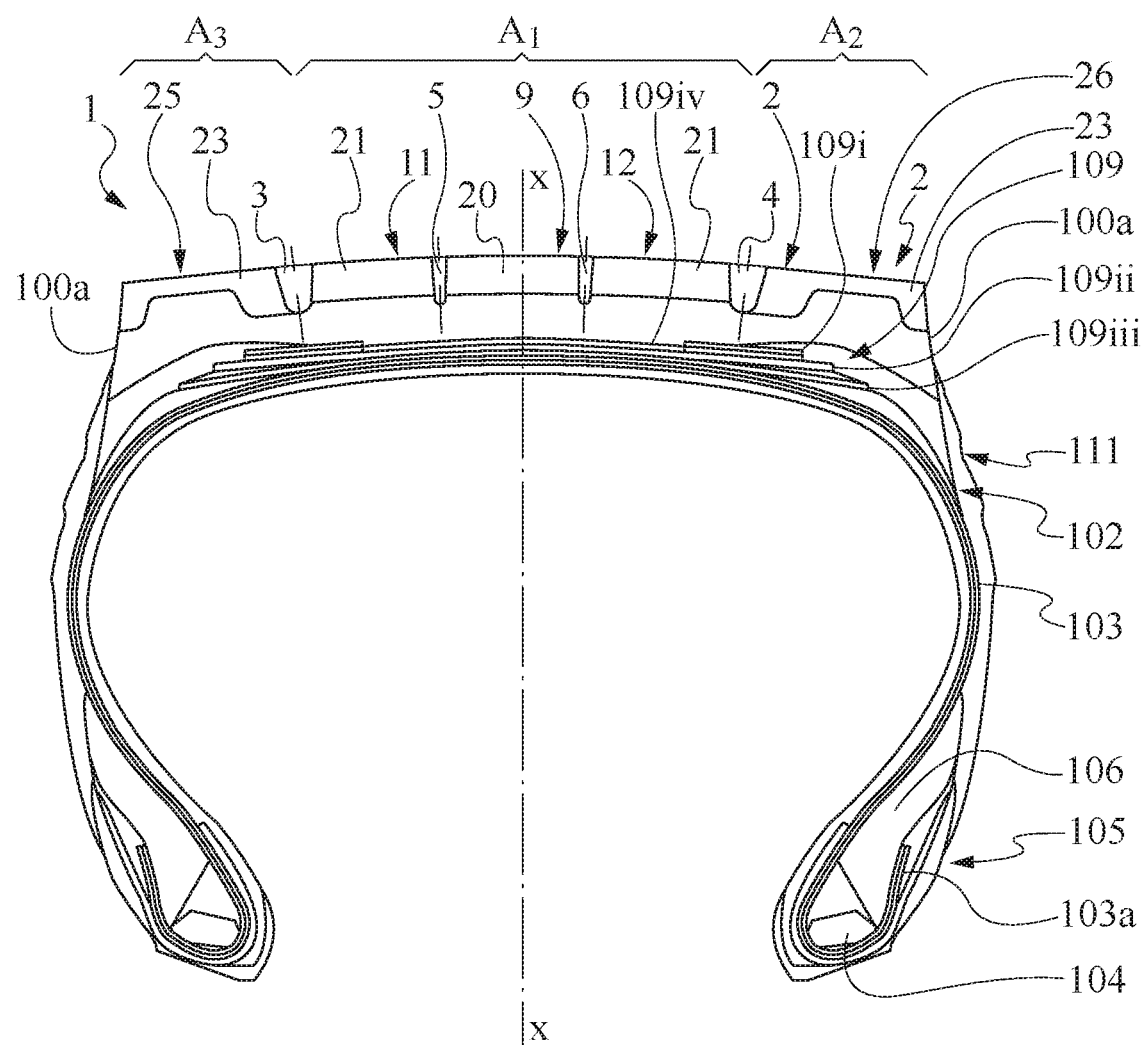
FIG. 2 is a radial sectional view of the tyre of FIG. 1.

Referring to the attached figures, a tyre for heavy load vehicle wheels according to the present invention, particularly a tyre intended to be fitted to the driving wheels of a heavy load vehicle, is generally indicated at 1.

The tyre 1 comprises a carcass structure 102, including at least one carcass ply 103 formed by reinforcing cords, typically made of metal, incorporated into an elastomeric matrix.

The carcass ply 103 has opposite end edges 103a engaged with respective bead cores 104. The latter are located in regions 105 of the tyre 1 usually called "beads". An elastomeric filling 106 taking up the space defined between the carcass ply 103 and the respective end edge 103a of the carcass ply 103 is applied onto the outer perimeter edge of the bead cores 104. The bead cores 104 hold the tyre 1 firmly fixed to an anchoring seat provided for this purpose in the wheel rim, thus preventing the bead 105 from coming out from such a seat during operation.

Specific reinforcing structures (not shown) having the function of improving the torque transmission to the tyre 1 may be provided at the beads 105.

In a radially outer position relative to the carcass structure 102 a belt structure 109 is provided, which preferably comprises several belt layers (four layers 109i, 109ii, 109iii, 109iv are shown in this specific example) arranged radially one on top of the other and having reinforcing cords, typically made of metal, with a crossed orientation and/or substantially parallel to the direction of circumferential development of the tyre 1.

A tread band 2 made of an elastomeric material is applied in a radially outer position relative to the belt structure 109.

Sidewalls 111 made of an elastomeric material are further respectively applied on the lateral surfaces of the carcass structure 102, each extending from one of the opposite lateral edges 100a of the tread band 2 up to the respective annular structure 104 for anchoring to the beads 105.

Referring to the exemplary embodiment shown in the figures, the tread band 2 comprises a central annular portion A1 and two shoulder annular portions A2, A3. The central annular portion A1, located across the equatorial plane X-X, is separated from the shoulder portions A2, A3 by two circumferential grooves 3, 4.

The circumferential grooves 3, 4 are mainly provided for ensuring water drainage in the footprint area, particularly when the tyre is running on a straight path. For this purpose, the circumferential grooves 3, 4 may have a width greater than or equal to about 2 mm.

Preferably, the circumferential grooves 3, 4 may have a width greater than or equal to about 3 mm, in any case smaller than or equal to about 20 mm, preferably smaller than or equal to about 15 mm.

Preferably, the circumferential grooves 3, 4 may have a depth greater than or equal to about 10 mm, preferably greater than or equal to about 15 mm, in any case smaller than or equal to about 30 mm. The choice of providing the circumferential grooves 3, 4 with a relevant depth allows good drainage features to be achieved.

More preferably, the circumferential grooves 3, 4 do not have circumferentially a straight course, rather a zig-zagging one. In other words, the circumferential grooves 3, 4 preferably extend along the whole circumferential development of the tyre 1 following a course forming a broken line, wherein first circumferential segments substantially inclined relative to the equatorial plane X-X and second circumferential segments inclined relative to the equatorial plane X-X, but counter-inclined relative to the first circumferential segments, are present. The second circumferential segments circumferentially alternate with the first circumferential segments. In this way, the traction of the tread band 2 in the advancing direction of the tyre 1 is advantageously increased.

Moving axially towards the equatorial plane X-X, the tread band 2 has two further circumferential grooves 5, 6 located inwardly relative to the two circumferential grooves 3, 4.

The circumferential grooves 5, 6 may have a smaller width as compared to the circumferential grooves 3, 4. Preferably, the circumferential grooves 5, 6 have a width greater than or equal to about 2 mm. Preferably, the circumferential grooves 5, 6 may have a width greater than or equal to about 3 mm, in any case smaller than about 10 mm. Preferably, the circumferential grooves 5, 6 may have a depth greater than or equal to about 10 mm, preferably greater than or equal to about 15 mm, in any case smaller than about 30 mm. The choice of providing the circumferential grooves 5, 6 with relevant depth and width allows good drainage features to be achieved.

The circumferential grooves 5, 6 do not have circumferentially a straight course too, rather a zig-zagging one. In other words, also the circumferential grooves 5, 6 preferably extend along the whole circumferential development of the tyre 1 with a course forming a broken line, wherein first circumferential segments substantially inclined relative to the equatorial plane X-X and second circumferential segments inclined relative to the equatorial plane X-X, but counter-inclined relative to the first circumferential segments, are present.

In greater detail, in the embodiment shown in the figures, the central annular portion A1 has three circumferential rows 9, 11, 12 of blocks, one circumferential row 9 of central blocks 20 and two circumferential rows 11, 12 of lateral blocks 21.

In the embodiment shown in the figures, the circumferential row 9 of central blocks 20 I located across the equatorial plane X-X.

The circumferential rows 11, 12 of lateral blocks 21 are located axially outwardly relative to the circumferential row 9 of central blocks 20, so that the circumferential row 11, of lateral blocks 21 is separated from the circumferential row 9 of central blocks 20 by the circumferential groove 5, and the circumferential row 12 of lateral blocks 21 is separated from the circumferential row 9 of central blocks 20 by the circumferential groove 6.

In the embodiment shown in the figures, the circumferential row 11 of lateral blocks 21 is axially interposed between the circumferential groove 3 and the circumferential groove 5, whereas the circumferential row 12 of lateral blocks 21 is axially interposed between the circumferential groove 4 and the circumferential groove 6.

In the embodiment shown in the figures, the circumferential row 9 of central blocks 20 is thus axially interposed between the circumferential groove 5 and the circumferential groove 6.

Each block 20, 21 is separated from a circumferentially consecutive block 20, 21 by a transverse groove 13, 15 arranged according to a generally axial direction.

Each block 20, 21 is provided with a radially outer top surface 7 and has a height M measured between the top surface and a bottom surface 14 of one of the transverse groove 13, 15 adjacent to the same block 20, 21. Preferably, the blocks 20, 21 may have a height M greater than or equal to about 10 mm, preferably greater than or equal to about 15, in any case smaller than or equal to about 30 mm.

In the embodiment shown in the figures, each block 20 is separated from the consecutive block 20 by a transverse groove 13, whereas each block 21 is separated from the consecutive block 21 by a transverse groove 15.

For providing a large number of circumferential grooves 13, 15, and thus good traction features, the blocks 20, as well as the blocks 21, may have a limited extension in circumferential direction; in other words, the blocks 20 and the blocks 21 have a maximum dimension We in circumferential direction smaller than 70 mm, preferably smaller than 60 mm.

Preferably, the number of transverse grooves 13, 15 in the tread band 2 is greater than or equal to about 40, preferably greater than or equal to about 50, in any case smaller than about 90, for example equal to about 60.

Each transverse groove 13 extends from a circumferential groove 5 to the axially consecutive circumferential groove 6.

Preferably, in the embodiment shown in the figures, each transverse groove 13 extends from the circumferential groove 5 to the axially consecutive circumferential groove 6 not with a straight course, but with a swerved course.

More particularly, in the embodiment shown in the figures, the transverse grooves 13 preferably extend from the circumferential groove 5 to the axially consecutive circumferential groove 6 following a course forming a broken line, wherein two segments of longer extension 13a, inclined relative to the equatorial plane X-X, and a segment of shorter extension 13b, substantially parallel to, or slightly inclined relative to, the equatorial plane X-X and connecting said two segments of longer extension 13a, are present.

Each transverse groove 13 has a depth H corresponding to the height M of the blocks 20 which are circumferentially adjacent to the transverse groove itself. Preferably, the transverse grooves 13 may have a depth H greater than or equal to about 10 mm, preferably greater than or equal to about 15 mm, in any case smaller than or equal to about 30 mm.

Preferably, the transverse grooves 13 may have a width smaller than or equal to about 4 mm, preferably smaller than or equal to about 2 mm, in any case greater than or equal to about 0.5 mm. Advantageously, the depth of each transverse groove 13 along its extension from one circumferential groove 5 to the axially consecutive circumferential groove 6 is substantially constant.

Each transverse groove 15 extends instead from a circumferential groove 3, 4 to the axially consecutive circumferential groove 5, 6.

In the embodiment shown in the figures each transverse groove 15 extends from a circumferential groove 3, 4 to the axially consecutive circumferential groove 5, 6 with a straight course, inclined relative to the equatorial plane X-X. Preferably, each transverse groove 15 extends from a circumferential groove 3, 4 to the axially consecutive circumferential groove 5, 6 following a straight course inclined by an angle different from 90°, for example an angle of about 70°, relative to a direction parallel to the equatorial plane X-X.

In the exemplary tread band 2 shown in the figures, the transverse grooves 15 of the circumferential row 11 of lateral blocks 21 and of the circumferential row 12 of lateral blocks 21 have substantially the same configuration.

For the sake of a simple description and for reading convenience, in the following description the configuration of the transverse grooves 15 will be described referring explicitly to a transverse groove 15 of the circumferential row 11, being understood that the same holds also for the grooves 15 of the circumferential row 12.

Each transverse groove 15 has a depth H corresponding to the height M of the blocks 21 which are located circumferentially adjacent to the transverse groove itself. Preferably, the transverse grooves 15 may have a depth H greater than or equal to about 10 mm, preferably greater than or equal to about 15 mm, in any case smaller than or equal to about 30 mm.

Preferably, the depth H of each transverse groove 15 along the extension thereof from a circumferential groove 3 to the axially consecutive one is substantially constant.

Preferably, the transverse grooves 15 are provided with two segments 16, 17 of different width.

In particular, the transverse grooves 15 are provided with a first segment 16 having a width L1 and a second segment 17 having a width L2, where L2<L1.

Transverse grooves 15 formed by a segment of larger width and a segment of smaller width allow a good compromise between traction ability and reduced rolling resistance to be achieved.

Preferably, the width L1 of the first segment 16 is equal to or greater than 4 mm; preferably, the width L1 is smaller than 8 mm.

Preferably, the width L2 is equal to or smaller than 2 mm; preferably, the width L2 is greater than 0.5 mm In the exemplary tread band 2 shown in the figures, the first segment 16 and the second segment 17 have a substantially constant width L1, L2, respectively, along their whole extension.

The sum of the axial extension of the first segment 16 and the second segment 17 is equal to the distance between the two axially consecutive circumferential grooves 3, 5 or 4, 6, between which the transverse groove 15 extends.

To this end, the first segment 16, as well as the second segment 17, of the transverse groove 15 may have an extension between 30% and 70% of the distance between the two axially consecutive circumferential grooves 3, 5 or 4, 6.

In particular, in the exemplary tread band 2 shown in the figures, the first segment 16 and the second segment 17 extend each over about 50% of the distance between the two axially consecutive circumferential grooves 3, 5 or 4, 6.

In the exemplary tread band 2 shown in the figures, the first segment 16 is arranged in axial direction, consecutively to the second segment 17.

For obtaining a more uniform behavior while the tyre is rolling, in the same circumferential row of blocks 21 the position of the first segments 16 relative to the position of the second segments 17 is not constant, rather it varies.

Figure 3:
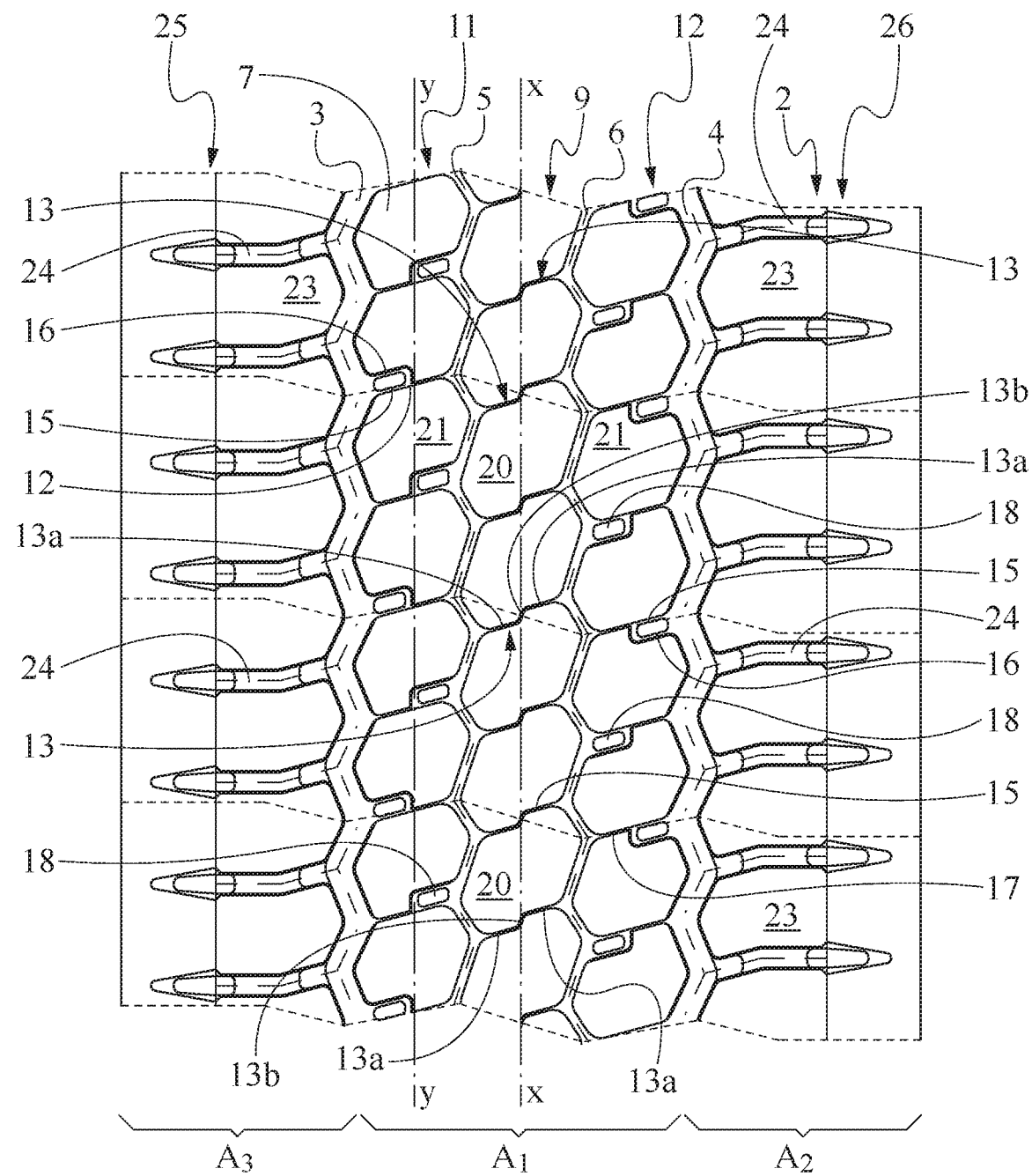
FIG. 3 is a schematic plan view of a tread band portion of the tyre of FIG. 1.
Figure 4:
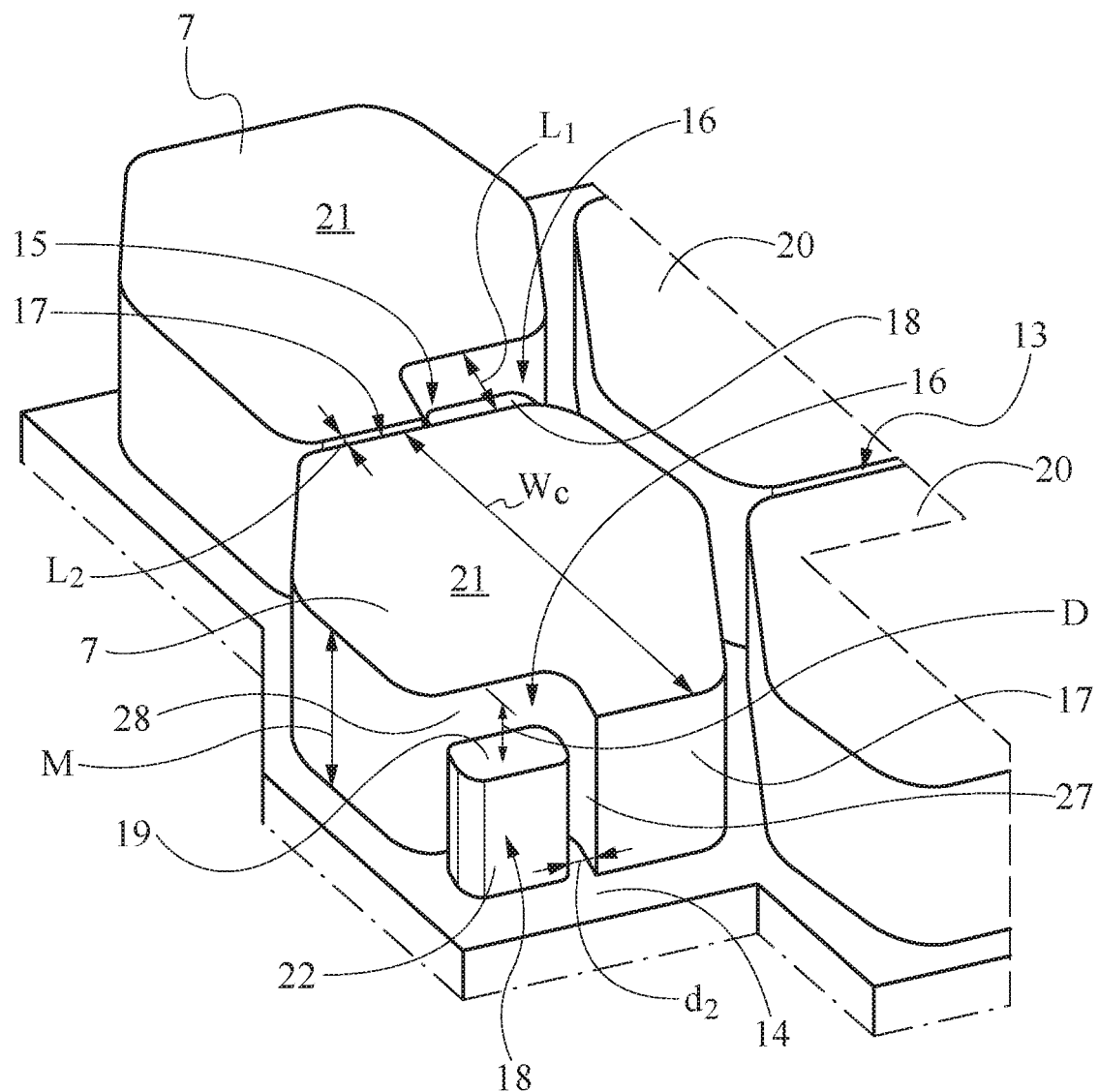
FIG. 4 is a schematic perspective view of an enlarged portion of the tread band of FIG. 3.

In particular, considering a reference circumferential direction (for example represented by Y-Y in FIG. 3) intersecting the transverse grooves 15, the first segments 16 of circumferentially consecutive transverse grooves 15 are located alternatively on both sides relative to the reference circumferential direction. Similarly, the second segments 17 of circumferentially consecutive transverse grooves 15 are located alternatively on both sides relative to the reference circumferential direction.

Still referring to the example in the figures, the first segment 16 of each transverse groove 15 is delimited by: two circumferentially opposite lateral walls 28 of two circumferentially consecutive blocks 21; a head wall 27 arranged substantially at a right angle relative to the two lateral walls 28 and opposing a circumferential groove 3, 5. The first segment 16 extends from a segment of a circumferential groove 3, 5 up to an end of the second segment 17.

In detail, still referring to the embodiment shown in the figures the first segment 16 is delimited by the lateral walls 28 of two circumferentially consecutive blocks 21 in circumferential direction, whereas in axial direction it is at least partially delimited by the head wall 27, formed in at least one of two circumferentially consecutive blocks 21.

The walls 27, 28 of the blocks 21 delimiting the first segment 16 have a radial extension equal to the height M of the blocks 21 which are circumferentially adjacent to the same first segment 16.

At least one filling element 18 is contained within each first segment 16.

The filling element has a lateral surface 22 and a radially outer top surface 19. The lateral surface extends radially from the bottom 14 of the transverse groove 15 and culminates at the top surface 19.

Figure 5:
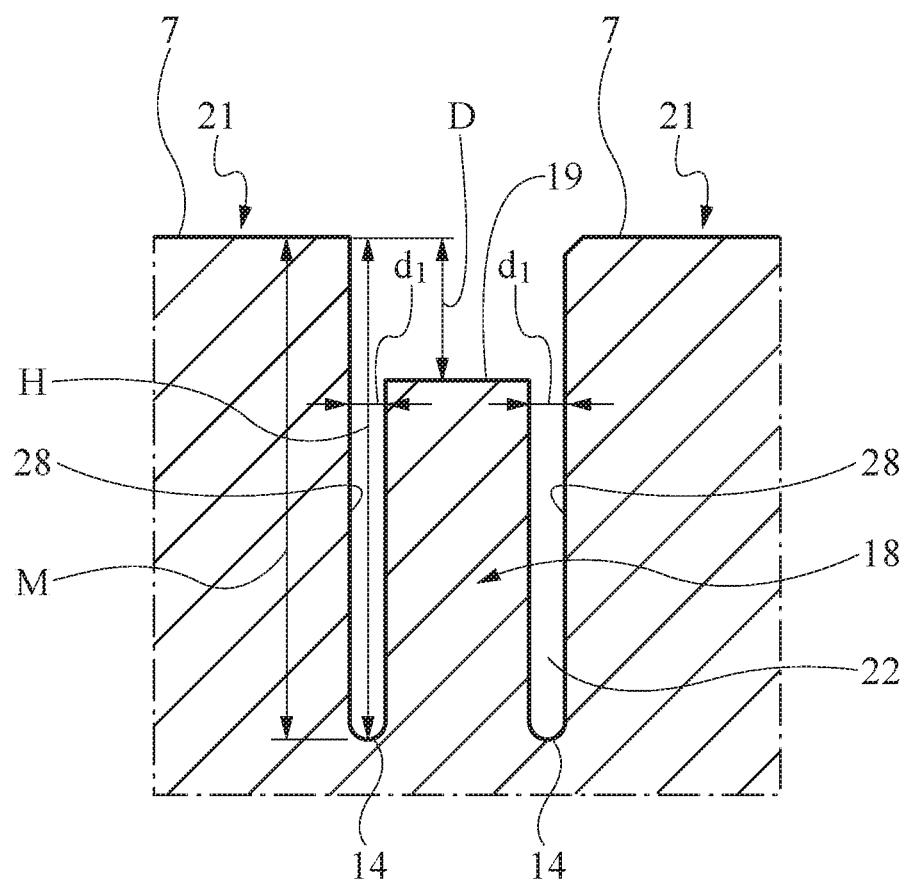
FIG. 5 is a schematic sectional view of a first segment of a transverse groove of FIG. 3.

The top surface o19 of the filling element 18 is located below the top surface 7 of the axially consecutive blocks 21, i.e. it has a height difference D relative to the top surface 7 of the blocks 21, as better shown in FIG. 5.

Preferably, the top surface 19 of the filling element 18 is located radially inwardly relative to the top surface 7 of the circumferentially consecutive blocks 21 at a radial distance (or height difference D) between 5% and 50% of the height M of the same blocks 21 themselves.

More preferably, the top surface 19 of the filling element 18 is located radially inwardly relative to the top surface 7 of the circumferentially consecutive blocks 21 at a radial distance (or height difference D) smaller than or equal to about 30-40% of the height M of the blocks 21.

In the example shown in the figures, the filling element 18 is contained within the first segment 16 of the transverse groove 15 in such a way that at least a portion of its lateral surface 22 faces a circumferential groove 3, 5 or 4, 6.

For effectively counteracting an undue mutual approach of the circumferentially consecutive blocks 21 while entering the footprint area, the filling element 18 takes up a considerable space, as compared to the space available in the first segment 16 of the transverse groove 15.

Figure 6:
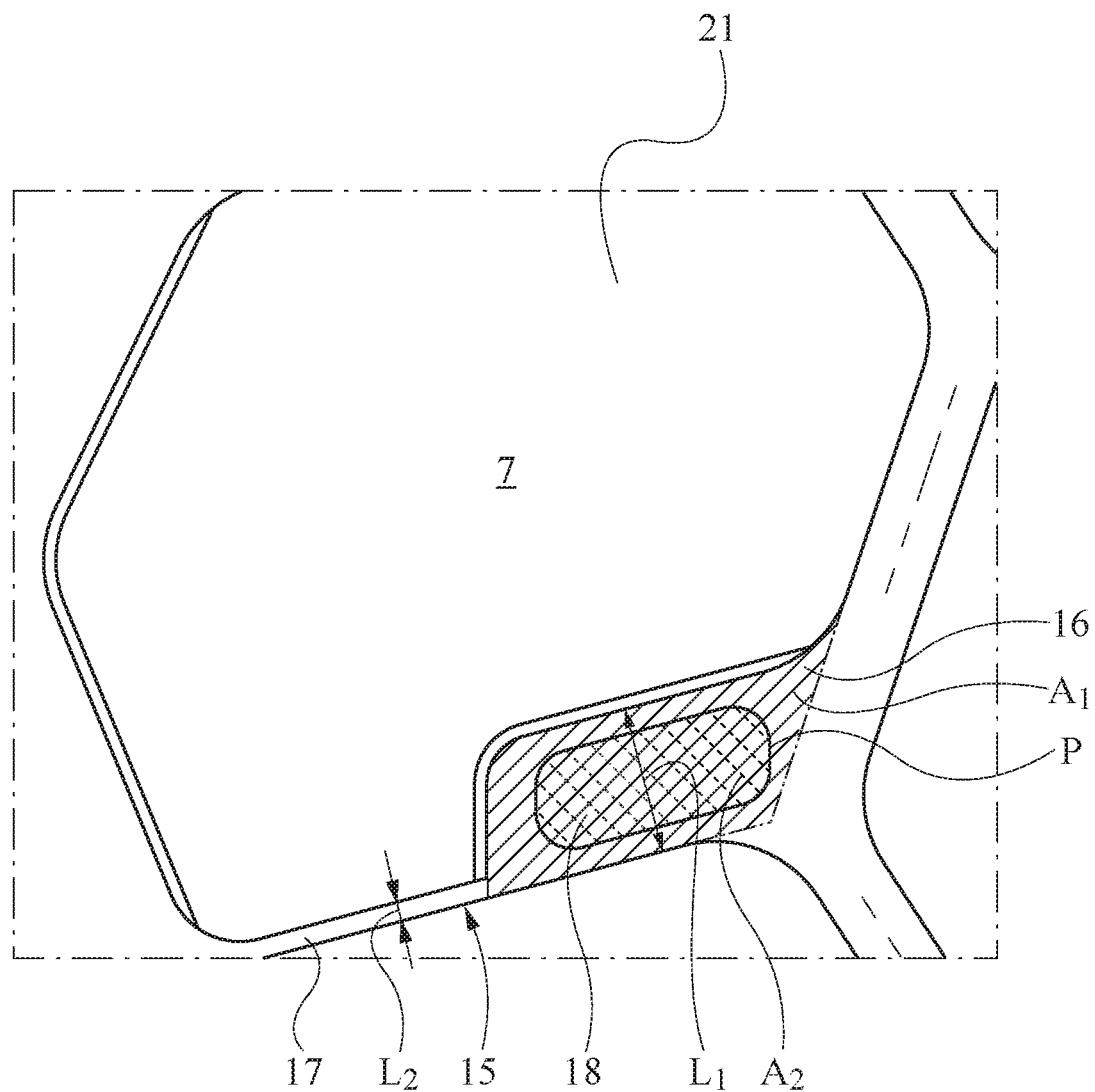
FIG. 6 is a schematic enlarged plan view of a first segment of a transverse groove of FIG. 3 wherein the plan surface area of the first groove segment and the plan surface area of the top surface of the filling element are represented with different hatchings.

More in detail, the plan surface area $A_2$ of the top surface 19 of the filling element 18 is preferably greater than 60% of the plan surface area $A_1$ of the first segment 16 of the transverse groove 15, more preferably greater than 70% of the plan surface area $A_1$ of the first segment 16 of the transverse groove 15. As schematically shown in FIG. 6, the plan surface area $A_1$ of the first segment 16 of the transverse groove 15, represented hatched by continuous inclined lines, refers to the surface area of the first segment 16 of the transverse groove 15 located at the same height of top surface of the blocks 21. The plan surface area $A_2$ of the top surface 19 of the filling element 18 is represented in FIG. 6 hatched by dashed (discontinuous) lines, counter-inclined relative the previous ones. For allowing a certain mobility of the filling element 18, it is spaced apart from the lateral walls 28 and the head wall 27 of the blocks 21 along at least 70% of its perimeter P.

Preferably, the filling element 18 is spaced apart from the lateral walls 28 and the head wall 27 of the blocks 21 along at least 95% of its perimeter P.

In particular, in the example shown in the figures, the filling element 18 is spaced apart from the lateral walls 28 and the head wall 27 of the blocks 21 along 100% of its perimeter P. In other words, between the lateral surface 22 of the filling element 18 and the lateral walls 28 and the head wall 27 of the blocks 21 there are no connecting elements.

Preferably, the lateral surface 22 of the filling element 18 is spaced apart from each lateral wall 28 of the blocks 21 over its whole radial extension.

Preferably, the lateral surface 22 of the filling 18 element is spaced apart from each lateral wall 28 of the blocks 21 by a distance d1 greater than 0.5 mm.

Preferably, the distance d1 may be smaller than 5 mm.

Preferably, the lateral surface 22 of the filling element 18 is spaced apart from the head wall 27 of the blocks 21 over its whole radial extension.

Preferably, the lateral surface 22 of the filling element is spaced apart from the head wall 27 of the blocks 21 by a distance d2 greater than 0.5 mm.

Preferably, the distance d2 may be smaller than 10 mm, more preferably smaller than 5 mm.

The filling element 18 undergoes a larger wear due to its size and to a greater mobility as compared to the size and mobility of the adjacent blocks 21; therefore, a height difference D relative to the height M of the blocks 21 is maintained substantially during the entire service life of the tyre, and the traction ability of the latter is thus not compromised.

Preferably, the tyre 1 further comprises, at each of the two shoulder annular portions A2, A3, a plurality of blocks 23 located along a respective circumferential row 25, 26 located between the respective circumferential groove 3, 4 and the respective axial end portion 100a of the tread band 2.

Each block 23 is separated from the circumferentially consecutive block 23 by means of a transverse groove 24.

The transverse grooves 24 preferably have a depth reduction at their axially innermost portion, so as to define a double-step course. The choice of keeping small the depth of the transverse grooves 24 of the shoulder annular portions A2, A3 at their axially innermost portion allows a greater strength against lateral and torsional stresses to be ensured.

The axial extension of the blocks 23 and of the transverse grooves 24 of the shoulder annular portions A2, A3 is preferably greater than the axial extension respectively of the blocks 20, 21 and of the transverse grooves 13, 15 of the central annular portion of the tread band 2.

In the tread pattern shown in the figures, the transverse grooves within the blocks 23 of the shoulder annular portions A2, A3 have substantially the same configuration and are substantially symmetrical relative to the equatorial plane X-X.

The present invention has been described with reference to some embodiments thereof. Many modifications can be made in the embodiments described in detail, still remaining within the scope of protection of the invention, defined by the following claims.

As an example, according to an embodiment not shown, each first segment 16 of the transverse grooves may contain two filling elements 18, preferably having the same configuration and dimension, arranged side by side in either axial or circumferential direction. Advantageously, according to this embodiment, the filling elements 18 are separated from each other by a groove having a width smaller than 2 mm, preferably smaller than 1.5 mm, in any case greater than 0.5 mm.

The invention claimed is:

1. A tyre for heavy load vehicle wheels with a tread band comprising:
   a plurality of circumferential grooves;
   a plurality of transverse grooves extending between two axially consecutive circumferential grooves of the plurality defining a plurality of blocks; and
   wherein each block comprises a radially outer top surface with a height measured between said top surface and a bottom surface of a respective transverse groove;
   wherein said transverse groove of the plurality comprises a first segment having a width L1 and a second segment having a width L2, L2 is less than L1, and said first segment is at least partially delimited by walls of two circumferentially consecutive blocks;
   wherein said walls comprise two circumferentially opposite lateral walls of two circumferentially consecutive blocks and a head wall arranged substantially at a right angle relative to the two circumferentially opposite lateral walls, and said head wall opposes a circumferential groove;
   wherein said first segment is delimited by said two circumferentially opposite lateral walls and said head wall, and said first segment extends from a segment of said circumferential groove up to an end of said second segment;

at least one filling element is contained within said first segment, wherein said at least one filling element with a radially outer top surface is located radially inwardly relative to said top surface of a block of the plurality at a radial distance between 5% and 50% of the height of the plurality of blocks;

wherein said top surface area of said at least one filling element has a plan surface greater than 60% of a plan surface area of said first segment; and wherein said at least one filling element is spaced apart from said walls along at least 70% of a perimeter of said at least one filling element.

2. The tyre for heavy load vehicle wheels according to claim 1, wherein said at least one filling element is spaced apart from said walls along at least 95% of the perimeter of said at least one filling element.

3. The tyre for heavy load vehicle wheels according to claim 1, wherein said walls further comprise said at least one filling element with at least one lateral surface, and wherein said at least one lateral surface extends radially from said top surface of said at least one filling element.

4. The tyre for heavy load vehicle wheels according to claim 3, wherein said at least one lateral surface is spaced apart from each of said lateral walls by a distance greater than 0.5 mm.

5. The tyre for heavy load vehicle wheels according to claim 3, wherein said at least one lateral surface is spaced apart from each of said lateral walls over a whole radial extension of said lateral surface.

6. The tyre for heavy load vehicle wheels according to claim 3, wherein said at least one lateral surface is spaced apart from each of said lateral walls by a distance smaller than 5 mm.

7. The tyre for heavy load vehicle wheels according to claim 3, wherein said at least one lateral surface is spaced apart from said head wall by a distance greater than 0.5 mm.

8. The tyre for heavy load vehicle wheels according to claim 7, wherein said at least one lateral surface is spaced apart from said head wall by a distance smaller than 10 mm.

9. The tyre for heavy load vehicle wheels according to claim 7, wherein said at least one lateral surface is spaced apart from said head wall by a distance smaller than 5 mm.

10. The tyre for heavy load vehicle wheels according to claim 7, wherein said at least one lateral surface is spaced apart from said head wall over the whole radial extension of said lateral surface.

11. The tyre for heavy load vehicle wheels according to claim 3, wherein at least one portion of the at least one lateral surface faces a circumferential groove of the plurality.

12. The tyre for heavy load vehicle wheels according to claim 1, wherein said first segment extends over between 30% and 70% of a distance between said two axially consecutive circumferential grooves.

13. The tyre for heavy load vehicle wheels according to claim 1, wherein said second segment extends over between 30% and 70% of a distance between said two axially consecutive circumferential grooves.

14. The tyre for heavy load vehicle wheels according to claim 1, wherein a sum of the axial extension of the first segment and of the second segment is equal to a distance between said two axially consecutive circumferential grooves.

15. The tyre for heavy load vehicle wheels according to claim 1, wherein said width L2 is equal to or smaller than 2 mm.

16. The tyre for heavy load vehicle wheels according to claim 1, wherein said width L1 is equal to or greater than 4 mm.

17. The tyre for heavy load vehicle wheels according to claim 1, wherein a depth of each transverse groove of the plurality from one circumferential groove to the axially consecutive circumferential groove is substantially constant.

18. The tyre for heavy load vehicle wheels according to claim 1, wherein said first segment is located consecutively to said second segment.

19. The tyre for heavy load vehicle wheels according to claim 1, wherein said plurality of transverse grooves comprises at least forty transverse grooves.

20. The tyre for heavy load vehicle wheels according to claim 1, wherein the first segments of the plurality of transverse grooves alternate to a side relative to a reference circumferential direction.

21. The tyre for heavy load vehicle wheels according to claim 1, wherein said blocks have a maximum dimension in a circumferential direction smaller than 70 mm.

22. The tyre for heavy load vehicle wheels according to claim 1, wherein said tread band has a central annular portion located across an equatorial plane and two shoulder annular portions separated from said central annular portion by two of said plurality of circumferential grooves, wherein said central annular portion has at least one row of central blocks and at least two rows of lateral blocks, and wherein the at least two rows of lateral blocks located opposite to said at least one row of central blocks and having a plurality of said transverse grooves with said at least one filling element.

* * * * *